W. M. JAMESON.
HOSE SUPPORTER.
APPLICATION FILED JUNE 30, 1919.

1,345,193.

Patented June 29, 1920.

Inventor.
Winthrop M. Jameson
by Heard Smith & Tennant.
Attys.

UNITED STATES PATENT OFFICE.

WINTHROP M. JAMESON, OF CAMBRIDGE, MASSACHUSETTS.

HOSE-SUPPORTER.

1,345,193.  Specification of Letters Patent.  Patented June 29, 1920.

Application filed June 30, 1919. Serial No. 307,815.

*To all whom it may concern:*

Be it known that I, WINTHROP M. JAMESON, a citizen of the United States, residing at Cambridge, county of Middlesex, State of Massachusetts, have invented an Improvement in Hose-Supporters, of which the following description, in connection with the accompanying drawing, is a specification, like characters on the drawing representing like parts.

This invention relates to hose supporters or garters of leg encircling type such as are usually worn by men.

The object of the invention is to provide a hose supporter of this type which may be made entirely free from any rubber or other similar elastic material subject to deterioration and in which preferably the fabric portion is made entirely of non-elastic material and in which the required amount of elasticity is secured by a resilient metal spring.

The object of the invention is further to provide a hose supporter of this type in which the ends of the leg encircling band are detachably and yieldingly united by a two part separable fastener, one part consisting of a loop member and the other part of a hook shaped member within which the spring is entirely inclosed.

The object of the invention is further to provide a device of this character which shall be compact in form, simple in operation, and economical to manufacture; so that the hose supporter shall present a pleasing appearance, shall produce no discomfort when being worn, and shall be salable at a reasonable price.

While various spring constructions have been suggested for hose supporters they have not heretofore been able successfully to compete with the type of hose supporter in which an elastic fabric is used. When an elastic fabric is employed it readily deteriorates when the hose supporters are not in use so that it is impossible for the manufacturer or dealer to carry hose supporters in stock for any great length of time and moreover such a fabric rapidly and readily deteriorates when the hose supporter is in use, requiring it to be constantly adjusted and causing it gradually to lose its resiliency until the hose supporter is rendered useless.

All these objections are removed in a simple and efficient manner by the present invention which enables the fabric portion to be made entirely of non-elastic material and which provides a simple, efficient, and durable means for obtaining the required elasticity, while at the same time providing for the simple and ready adjustment of the hose supporter and its placing in position and removing from the leg of the wearer.

The objects and purposes of the invention will appear more fully from the accompanying description and drawings and will be particularly pointed out in the claims.

The drawings illustrate a hose supporter of the ordinary pad type designed for men's wear and provided with the preferred form of construction embodying the present invention.

In the drawings—

Figure 1:
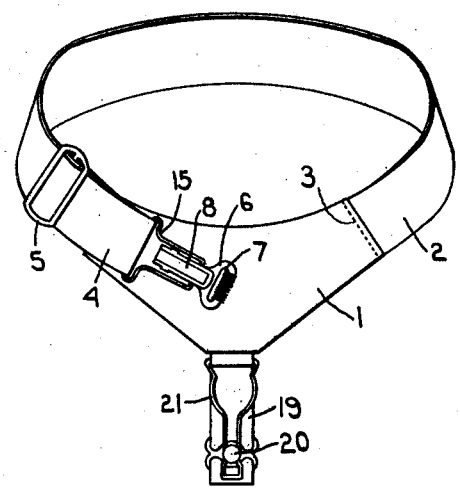
Figure 1 is a view in perspective of an ordinary type of pad hose supporter or garter showing the preferred form of the invention embodied therein.

The principles of this invention are applicable to various types of hose supporters and garters, but in view of the prevalence of the use of the pad type and for convenience of illustration the preferred form of the invention herein disclosed is shown in connection with a hose supporter or garter of the pad type in which the pad at its upper portion forms a part of the leg encircling band and at its lower portion is provided with a suitable means for connecting it to the garter.

The pad 1, which may be of the general triangular shape, illustrated, is formed in the usual manner by stitching together several layers of fabric. The leg encircling band is shown as formed of the upper portion or section of the pad 1 and a band 2 consisting of a strip of fabric such as narrow webbing of a non-elastic character. This strip of fabric 2 is connected to the pad 1 by stitching 3 and at its free end 4 is doubled back upon itself and connected to a buckle like device 5 by means of which the length of the leg encircling band may be adjusted with any desired degree of accuracy to suit the requirements of the wearer.

The free end of the band and the pad are connected detachably and yieldingly by a two part separable fastener.

Figure 2:
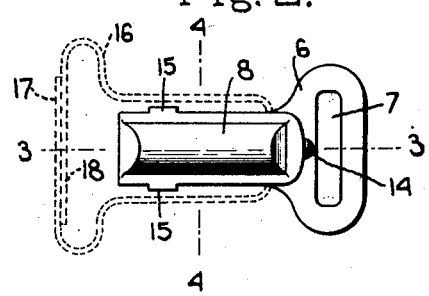
Fig. 2 is a plan view of the hook shaped casing which incloses the longitudinally expansible spring and constitutes one part of the two part separable fastener detachably and yieldingly uniting the ends of the encircling band with the loop member which constitutes the other part of the said fastener shown in dotted lines.
Figure 4:
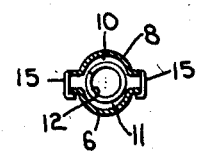
Fig. 4 is a view in transverse cross section taken on the line 4—4 of Fig. 2.
Figure 3:
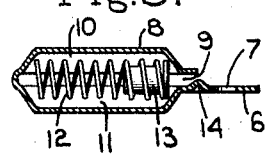
Fig. 3 is a view in longitudinal cross section of the hook shaped casing and inclosed spring taken on the line 3—3 of Fig. 2.

One part of this separable fastener shown in detail in Figs. 2, 3, and 4 consists of a hook shaped casing with an inclosed longitudinally expansible spring. This hook shaped casing is preferably formed from a piece of sheet metal the lower portion 6 of which is provided at its end with a transverse extension having a slot 7 by means of which it is secured as by stitching to the pad in such a manner that it rests and pivots or hinges upon the pad and is protected from contact with the leg of the wearer. The upper portion 8 of this strip of metal is bent back over the lower portion so as to form therewith a hook having its mouth at 9. The upper and lower portions are provided with oppositely disposed longitudinal cavities 10 and 11 facing each other and these cavities are preferably formed by striking out substantially semicylindrical pockets in the sheet metal.

The longitudinal expansible spring 12 is preferably in the form of a helix and is seated in the opposite cavities 10 and 11 of the hook shaped casing, the inner end abutting against the base of the hook. Preferably the outer end of the spring is provided with a plug 13. The spring when in its normal expanded condition entirely fills the hook cavities. The lower portion 6 is struck up at 14 at the mouth of the hook or the mouth is otherwise formed so that the opening into the mouth is of less width than the thickness of the loop member hereinafter described, and the upper and lower portions of the hook shaped casing yield relatively to each other to allow the loop member to pass through the opening into the mouth and yet to prevent it from being accidentally or undesirably disengaged. In order to make the hook shaped casing of proper strength the upper and lower portions are preferably secured together as by lugs 15 formed on the upper portion and bent down beneath the lower portion. These lugs are located at points which are at no greater distance from the inner end of the hook shaped casing than is the point reached by the outer end of the spring when under maximum compression. Hence, the lugs do not limit in any way the movement of the loop member relatively to the hook shaped casing.

The other part of the two part separable fastener is a loop 16 preferably formed of wire and of the shape illustrated. This loop member is secured to the free end 4 of the leg encircling band as by placing the overlapping ends 17 and 18 of the loop member within the doubled end of the band. This loop member as already stated is of a thickness which is slightly greater than the opening into the mouth 9 of the hook shaped casing so that when the two parts of the fastener are connected the loop member is snapped through the opening into the mouth of the hook shaped casing and rests against the outer end of the spring 12, as for example, against the face of the plug 13.

When the hose supporter is in place upon the wearer the leg encircling band should be adjusted so that under normal conditions the spring 12 shall not be materially compressed. During the movement of the leg from one position to another the two parts of the two part separable fastener slide relatively to each other effecting the contraction and expansion of the spring, and the loop member during this movement is guided in the mouth of the hook shaped casing. Thus at all times the required elasticity is provided. It has been found after careful tests in use that it is only necessary for the leg encircling band of a hose supporter of this type to have an expansion and contraction to the amount of about ⅜ of one inch to answer all the requirements of comfort and security in performing its function. Hence, it is only necessary to make the hook shaped casing of such a length as to enable the spring when of the required resiliency to be of such a length as to have a movement of about ⅜ of one inch, but the invention places no limit upon the length which may be employed. The spring is, however, preferably designed to be of such strength and resiliency as to yield comfortably to secure the necessary elasticity of the leg encircling band, and to have a maximum movement in yielding from the position shown in Fig. 3 to a position where its outer end is approximately in line with the lugs 15 of substantially ⅜ of an inch.

During the expanding and contracting movement of the parts of the two part separable fastener relatively to each other the loop member may pivot or swing transversely relatively to the hook member thus enabling the two part fastener to conform to the contour of the leg of the wearer at all times. So also the loop member may pivot or swing laterally relatively to the hook member if the leg encircling band is distorted in either direction lengthwise of the leg of the wearer from its normal position during walking or change of posture. This flexibility of the two parts of the separable fastener with respect to each other insures comfortable conformation to the leg of the wearer under all conditions of use.

Suitable means are provided for attaching the hose supporter to the hose. For this purpose any suitable clasp or device may be secured as to the lower portion of the pad 1; as illustrating this feature the pad is shown as provided with a depending tab 19 carrying a button 20 and a wire member 21 provided with a key hole shaped opening. The hose is placed over the button 20 and the member 21 slid longitudinally into place to bind the hose between the lower narrow end thereof and the neck of the button.

Having thus described my invention what I claim as new and desire to secure by Letters Patent is—

1. A hose supporter comprising a non-elastic leg encircling band, means depending from said band for attachment to the hose, a two part separable fastener detachably and yieldingly uniting the ends of said band, one part of the said fastener consisting of a hook shaped casing and a longitudinally expansible spring inclosed therein, and the other part of the said fastener consisting of a loop member which when in engagement with the first part swings transversely of the first part and rests against the end of the said spring and guided by the mouth of the hook shaped casing slides longitudinally thereof with and against the action of said spring.

2. A hose supporter comprising the construction defined in claim 1 in which the said spring at its outer end is provided with a plug against which the loop member rests.

3. A hose supporter constructed as defined in claim 1 in which the opening into the mouth of the hook shaped casing is of less width than the thickness of the loop member and in which the upper and lower portions of the hook shaped casing yield relatively to allow the passage of the loop member into and out from the mouth of the casing whereby the loop member is prevented from undesired disengagement.

4. A hose supporter constructed as defined in claim 1 in which the upper and lower portions of the hook shaped casing are connected at both sides at points located at no greater distance from the inner end of the hook shaped casing than is the point reached by the outer end of the spring when the spring is under maximum compression.

5. A hose supporter constructed as defined in claim 1 in which the hook shaped casing is formed from a piece of sheet metal bent back upon itself to form a hook and in which the bent back portion and the portion opposite thereto are both provided with longitudinal cavities in which the said spring is located.

6. A hose supporter comprising a pad to rest against the leg, a non-elastic band connected at one end to the pad and adapted therewith to encircle the leg, means connected to the pad for attachment to the hose, a two part separable fastener detachably and yieldingly uniting the free end of the band and the pad, one part of said fastener consisting of a hook shaped casing resting upon and secured to the pad and a longitudinally expansible spring inclosed therein, and the other part of said fastener consisting of a loop member secured to the free end of the band and which when in engagement with the first part of the said fastener swings transversely of the first part and rests against the end of said spring and guided by the mouth of the hook shaped casing slides longitudinally thereof with and against the action of said spring.

7. A hose supporter comprising the construction defined in claim 1 in which the loop member is of greater width than the hook shaped casing to permit a relative lateral swinging movement of said members.

In testimony whereof, I have signed my name to this specification.

WINTHROP M. JAMESON.